US012623841B2

(12) United States Patent (10) Patent No.: US 12,623,841 B2
Yamane et al. (45) Date of Patent: May 12, 2026

(54) ROBOT AND ARTICLE DIMENSION OBTAINMENT METHOD

(71) Applicant: KAWASAKI JUKOGYO KABUSHIKI KAISHA, Kobe (JP)

(72) Inventors: Hideshi Yamane, Kobe (JP); Eiji Yoshikuwa, Kobe (JP); Toshiyuki Tsujimori, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 463 days.

(21) Appl. No.: 18/038,047

(22) PCT Filed: Nov. 24, 2021

(86) PCT No.: PCT/JP2021/042913
§ 371 (c)(1),
(2) Date: May 22, 2023

(87) PCT Pub. No.: WO2022/113975
PCT Pub. Date: Jun. 2, 2022

(65) Prior Publication Data
US 2024/0002147 A1 Jan. 4, 2024

(30) Foreign Application Priority Data

Nov. 24, 2020 (JP) ................................. 2020-194098

(51) Int. Cl.
| *B25J 19/02* | (2006.01) |
| *B25J 13/08* | (2006.01) |
| *B65G 1/04* | (2006.01) |

(52) U.S. Cl.
CPC .......... *B65G 1/0421* (2013.01); *B25J 13/085* (2013.01); *B65G 1/0435* (2013.01)

(58) Field of Classification Search
CPC .... B65G 1/0421; B65G 1/0435; B25J 13/085; B25J 9/1612; B25J 15/0014; B25J 15/0616; B25J 13/08; B25J 9/16; B25J 19/02; G05B 2219/39558; G05B 2219/40542; G01B 5/043; G01B 21/00
See application file for complete search history.

(56) References Cited

U.S. PATENT DOCUMENTS

| 10,455,212 | B1 * | 10/2019 | Konolige ............. H04N 13/282 |
| 2016/0096274 | A1 | 4/2016 | Baylor et al. |
| 2016/0288324 | A1 | 10/2016 | Bradski et al. |
| 2017/0246744 | A1 | 8/2017 | Chitta et al. |

(Continued)

FOREIGN PATENT DOCUMENTS

| CN | 104990515 | A | * | 10/2015 |
| CN | 108140168 | A | | 6/2018 |

(Continued)

*Primary Examiner* — Justin Holmes
(74) *Attorney, Agent, or Firm* — Oliff PLC

(57) ABSTRACT

A robot includes a holder, a puller, a sensor, and a dimension obtainer. The holder holds an article placed on a supporter. The puller pulls the holder to a front side. The sensor detects that the article being pulled out ceased being on the supporter. The dimension obtainer obtains a dimension of the article along a pullout direction based on a distance that the article is pulled for from when the puller starts to pull out the article until when the sensor detects that the article ceased being on the supporter.

9 Claims, 7 Drawing Sheets

(56) References Cited

U.S. PATENT DOCUMENTS

| 2018/0155129 A1 | 6/2018 | Lagziel et al. | |
| 2018/0297200 A1* | 10/2018 | Nakayama | B25J 9/1612 |
| 2019/0034727 A1 | 1/2019 | Chihara et al. | |
| 2020/0294244 A1 | 9/2020 | Diankov et al. | |
| 2021/0107750 A1 | 4/2021 | Iino et al. | |
| 2022/0048717 A1 | 2/2022 | Sullivan et al. | |

FOREIGN PATENT DOCUMENTS

| CN | 109305500 A | 2/2019 | |
| DE | 11 2018 005 784 T5 | 8/2020 | |
| JP | 2019-509559 A | 4/2019 | |
| WO | WO-2014113762 A1 * | 7/2014 | B25J 9/1687 |
| WO | WO-2019093328 A1 * | 5/2019 | B25J 15/0616 |
| WO | 2020/160394 A1 | 8/2020 | |

* cited by examiner

FIG. 5

ROBOT AND ARTICLE DIMENSION OBTAINMENT METHOD

TECHNICAL FIELD

The present disclosure relates to obtainment of a dimension of an article by a robot.

BACKGROUND ART

Robots have been conventionally used to pick and transfer an article placed in a predetermined location. PTL 1 discloses a robot of this type.

The robotic picking system of PTL 1 picks a box from an unstructured pallet. This robotic picking system locates the box using a computer vision and/or one or more "exploratory picks" to determine the size and location of the box in the pallet.

The exploratory pick is a motion of the robot and an attached gripper lifting the outermost box from its corner by a small amount to separate it from the top layer. The system computes a difference between two images that are took before and after the separation to determine the size of the picked box and its position in the top layer.

PRIOR-ART DOCUMENTS

Patent Documents

PTL 1: Japanese Patent Application Publication No. 2019-509559.

SUMMARY OF THE INVENTION

Problems to be Solved by the Invention

With the configuration of above-mentioned PTL 1, the size of the box may not be obtained by the computer vision if the box is covered by another object. Therefore, a configuration that enables the obtainment of the size by a means different from the conventional method has been desired.

The present disclosure is made in view of the situation described above, and its purpose is to obtain a dimension of an article along the pullout direction, regardless of whether or not the surface of the article is covered by another object.

Means for Solving the Problems

The problem to be solved by the present disclosure is as described above. The means to solve this problem and the effects thereof will be described below.

A first aspect of the present disclosure provides a robot with a configuration described below. That is, the robot includes a holder, a puller, a sensor, and a dimension obtainer. The holder holds an article placed on a supporter. The puller pulls the holder to a front side. The sensor detects that the article being pulled out ceased being on the supporter. The dimension obtainer obtains a dimension of the article along a pullout direction based on a distance that the article is pulled for from when the puller starts to pull out the article until when the sensor detects that the article ceased being on the supporter.

A second aspect of the present disclosure provides an article dimension obtainment method described as follows. That is, the article dimension obtainment method includes a pulling out process, a detecting process, and an obtaining process. In the pulling out process, an article placed on a supporter is pulled out to a front by at least one of a robot body or an end effector. In the detecting process, a sensor detects that the article being pulled out ceased being on the supporter. In the obtaining process, a dimension of the article along a pullout direction is obtained based on a distance that the article is pulled for from when the pulling out process starts until when the sensor detects that the article ceased being on the supporter.

This allows the dimension of the article along the pullout direction to be obtained based on when the supporter ceases supporting the article in the process of pulling out the article.

Effects of the Invention

According to the present disclosure, the dimension of the article along the pullout direction can be obtained regardless of whether or not the article is covered by another object.

BRIEF DESCRIPTION OF THE DRAWINGS

FIG. 5 is a drawing illustrating an operation of a robot obtaining a depth dimension of an article.

EMBODIMENT FOR CARRYING OUT THE INVENTION

Figure 1:
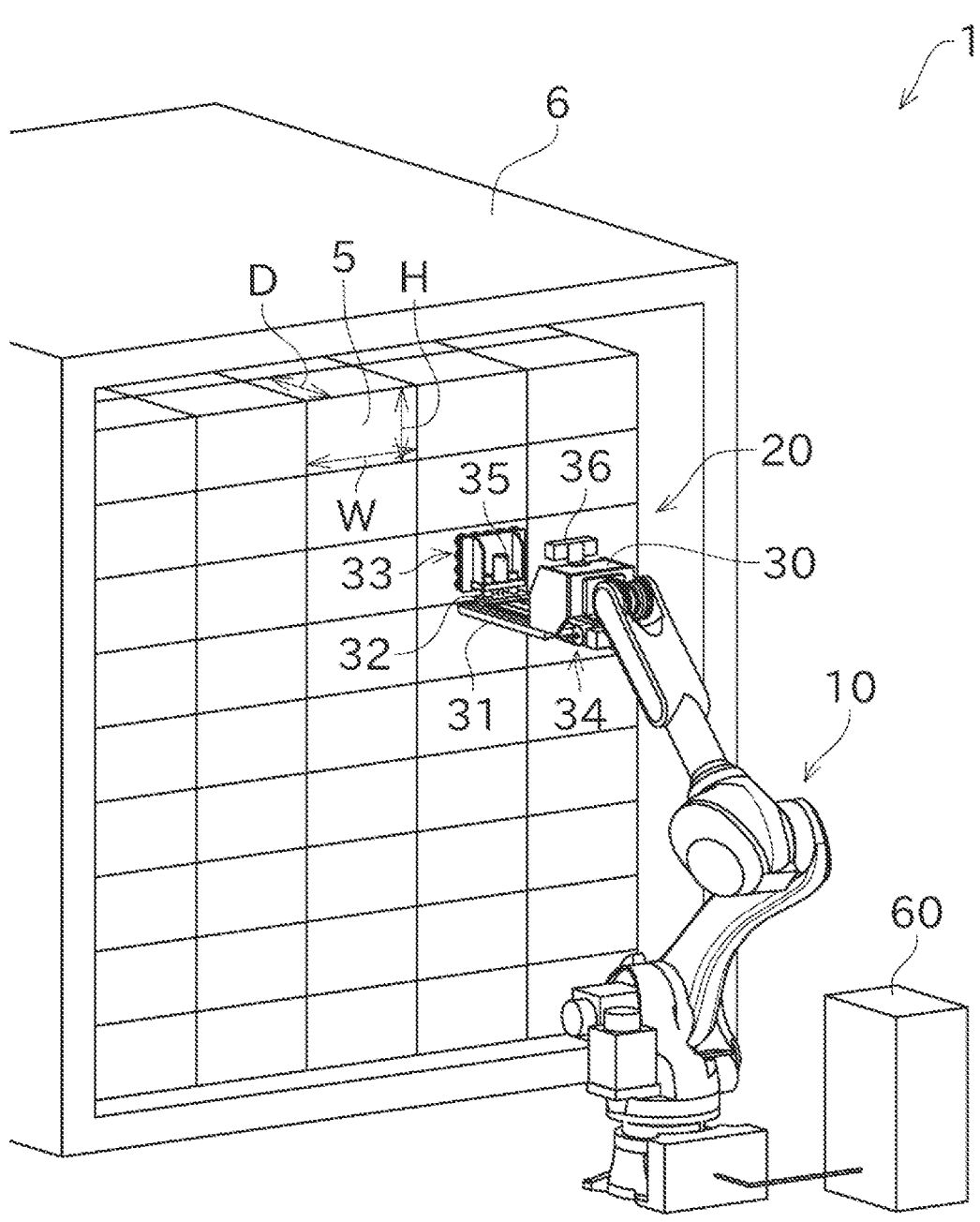
FIG. 1 is a perspective view showing an overall configuration of a robot according to one embodiment of the present disclosure.
Figure 2:
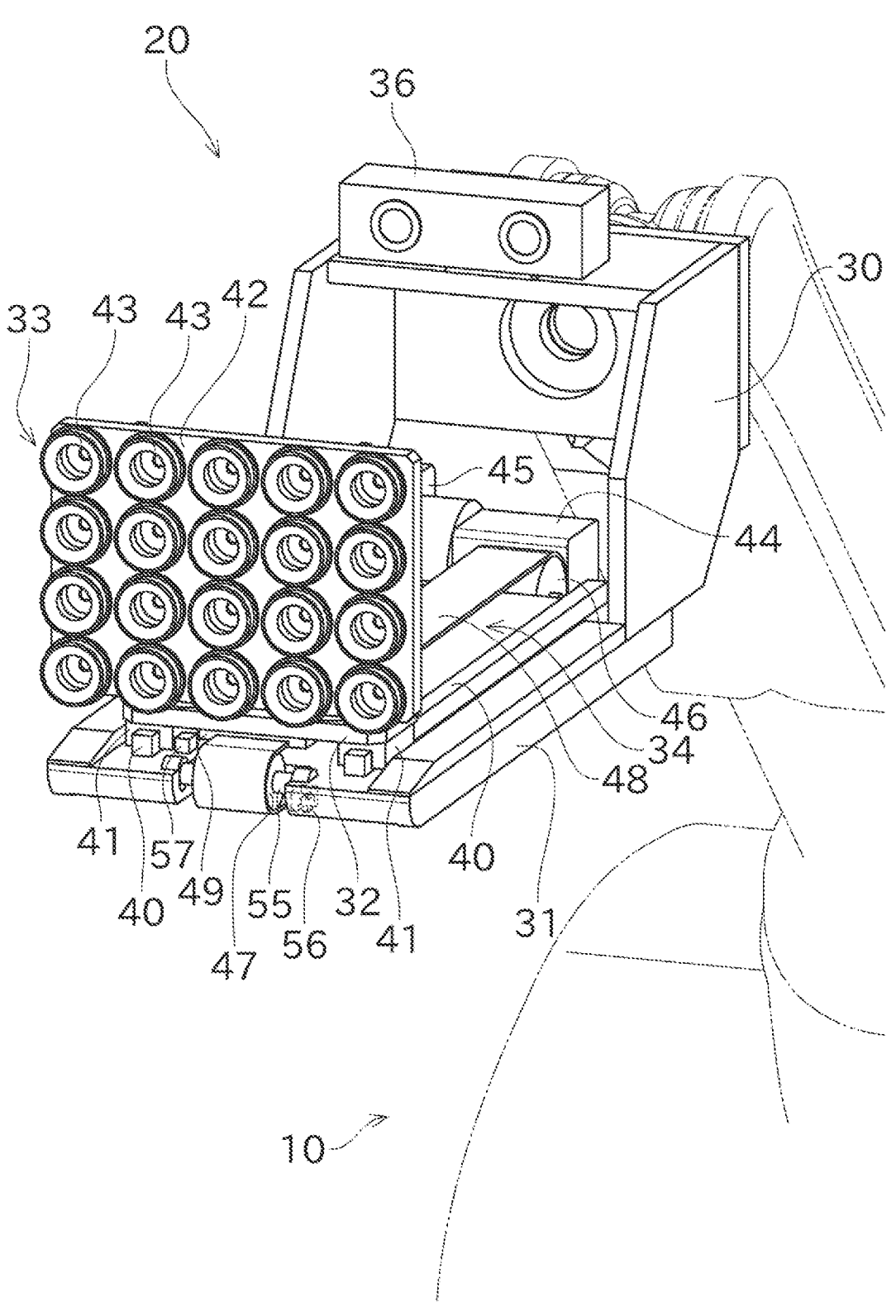
FIG. 2 is a perspective view showing a robot hand.
Figure 3:
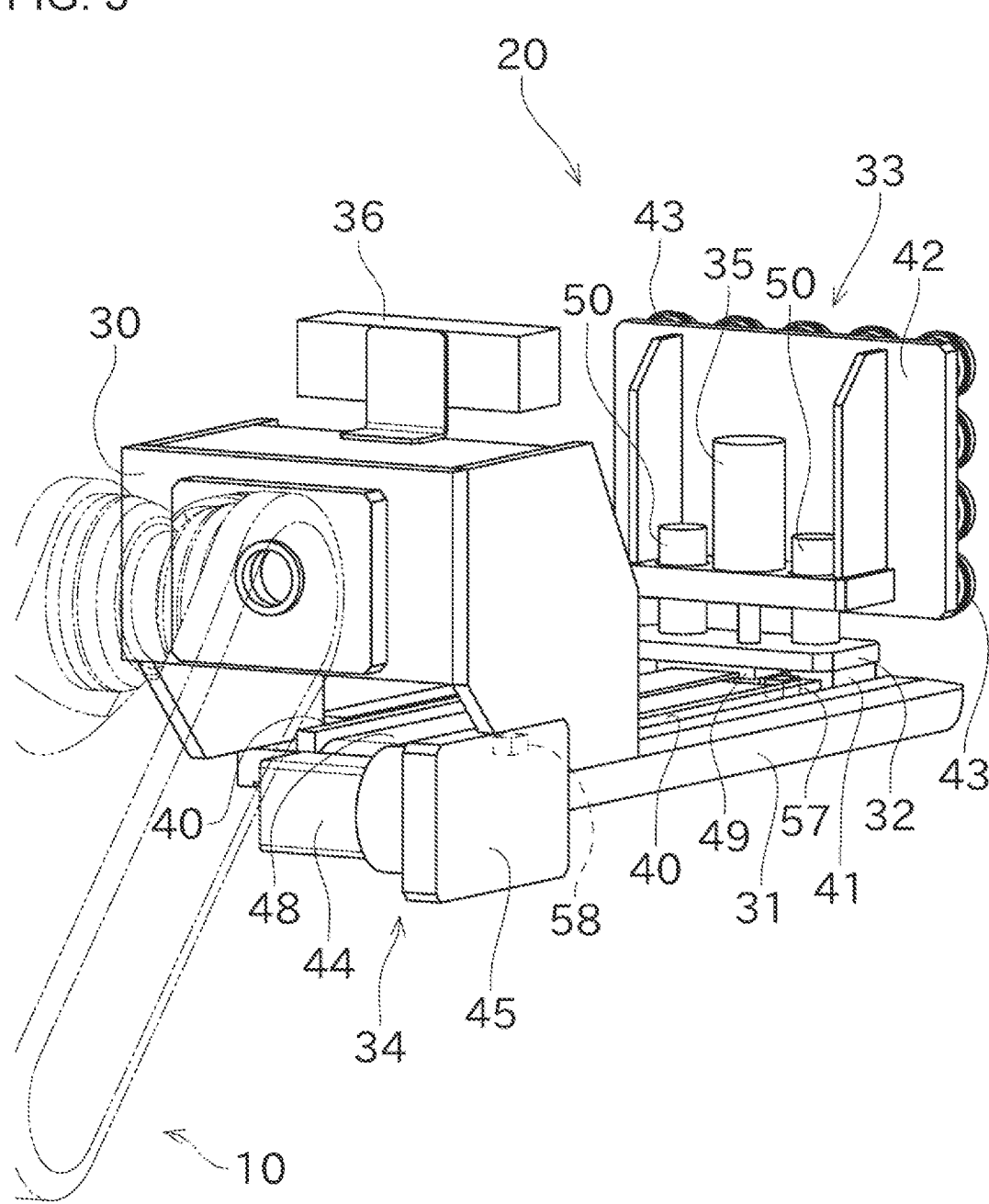
FIG. 3 is a perspective view showing a robot hand viewed from a robot body.

The disclosed embodiments will be described below with reference to the drawings. FIG. 1 is a perspective view showing an overall configuration of a robot 1 according to one embodiment of the present disclosure. FIG. 2 is a perspective view showing a robot hand 20. FIG. 3 is a perspective view showing the robot hand 20 viewed from the robot body 10.

The devanning robot (robot) 1 shown in FIG. 1 is used to take out an article 5, which is arranged three-dimensionally in a container 6, from the container 6 and transfer it to a predetermined position. The predetermined position may be, for example, but not limited to, on a conveyor, which is not shown in the drawings.

In the present embodiment, the article 5 is a box. Specifically, it is a rectangular cardboard box. The box may contain an object or it may also be empty.

In the following description, the closer side of the arranged article 5 viewed from the robot 1 may be referred to as the "front" side, the further side may be referred to as the "deep" side.

The robot 1 includes a robot body 10, a robot hand (an end effector) 20, and a controller 60.

The robot body 10 is configured as a known vertical articulated robot. The degrees of freedom of this robot may be, but is not limited to, 4 or 6.

The robot hand 20 is fixed to the distal end of the robot body 10. As the robot body 10 moves its arm in various ways, the robot hand 20 can move in various directions and change its orientation.

The controller 60 is configured as a known computer and includes a CPU, a ROM, a RAM, and the like. The controller 60 can control the movements of the robot body 10 and the robot hand 20.

Next, the configuration of the robot hand 20 will be described in detail. As shown in FIG. 2 and FIG. 3, the robot hand 20 includes a mounting base 30, a guide (a receiver) 31, a slide base 32, a suction part (a holder) 33, a pulling conveyor 34, a cylinder 35 and a camera 36.

The robot hand 20 is attached to the distal end of the robot body 10. Therefore, the orientation of the robot hand 20 can be changed variously by moving the arm of the robot body 10. Note that, as shown in FIG. 1 through FIG. 3, the robot hand 20 is usually used in such an orientation that the plate-shaped guide 31 is positioned on the bottom side and the thickness direction of the guide 31 is vertical. In the following description, this orientation may be referred to as the basic orientation. In the following description of the configuration of the robot hand 20, terms referring to directions, such as "tip" and "down", shall represent directions with respect to the basic orientation of the robot hand 20.

The mounting base 30 is configured to form a frame by fixing plate-like members to each other. The mounting base 30 is fixed to the distal end of the robot body 10.

The guide 31 is an elongate plate-shaped member. One longitudinal end of the guide 31 is fixed to the bottom portion of the mounting base 30. The guide 31 is approximately rectangular in plan view. As shown in FIG. 2, a pair of rails 40 is arranged on the top surface of the guide 31 to be parallel to each other. The longitudinal direction of the rails 40 coincides with the longitudinal direction of the guide 31.

The slide base 32 is a small plate-like shaped member. A pair of carriages 41 is fixed to the bottom portion of the slide base 32. The carriages 41 are mounted on the rails 40 and the rails 40 and the carriages 41 comprise a linear guide. This linear guide allows the slide base 32 to move linearly along the longitudinal direction of the guide 31.

The suction part 33 is attached on the top surface of the slide base 32. The suction part 33 includes a back plate 42 and more than one suction pad 43.

The back plate 42 is a plate-shaped member. The back plate 42 is attached to the slide base 32 with its thickness direction parallel to the longitudinal direction of the guide 31. The back plate 42 is supported by the slide base 32 with a lifting mechanism with the cylinder 35 that is described below installed between them. Thus, the back plate 42 can be raised and lowered with respect to the slide base 32.

The suction pad 43 is a hollow pad formed in a bellows shape. The suction pads 43 are arranged on the further surface of the back plate 42 fron the mounting base 30 to form a matrix. The suction pads 43 have openings facing away from the mounting base 30.

A negative pressure path that is not shown in the drawings is formed inside the back plate 42. This negative pressure path is connected to a suitable negative pressure source. Thus, the article 5 can be held by bringing the openings of the suction pads 43 close to or into contact with the surface of the article 5 so that they suck and stick to it while supplying negative pressure to the suction pads 43. The suction pad 43 is designed to change its shape and thus it can easily cling to the surface of the article 5. This enhances suction performance.

The pulling conveyor 34 pulls out the article 5 being sucked by the suction part 33 in an approximately horizontal direction by sliding the suction part 33 with the slide base

32. The pulling conveyor 34 includes a motor 44, a decelerator 45, a drive roller 46, a driven roller 47, and a belt 48, as shown in FIG. 2.

The motor 44 is configured as an electric motor that rotates forward and reverses. The housing of the motor 44 is fixed to the bottom portion of the mounting base 30.

The decelerator 45 decelerates the rotation of the motor 44 and transmits it to the drive roller 46. The decelerator 45 is comprised of, for example, a reduction gear train that is not shown in the drawings. The housing of the decelerator 45 is fixed to the bottom portion of the mounting base 30.

The drive roller 46 is arranged near an end of the guide 31 with respect to the longitudinal direction closer to the mounting base 30. The drive roller 46 is rotatably supported by the mounting base 30. The axis of rotation of the drive roller 46 is horizontal and parallel to the width direction of the guide 31.

The driven roller 47 is arranged at an end of the guide 31 with respect to the longitudinal direction further from the mounting base 30. A recess is formed on the distal end of the guide 31, and the driven roller 47 is arranged in this recess. The driven roller 47 is rotatably supported by the guide 31. The axis of rotation of the driven roller 47 is horizontal and parallel to the width direction of the guide 31.

The belt 48 is an endless belt and is looped around the drive roller 46 and the driven roller 47. The belt 48 is arranged at the center of the guide 31 with respect to its width direction in plan view. The belt 48 is arranged so that it rotates around the guide 31. On the upper side of the guide 31, a fixing member 49 is attached to the belt 48. The slide base 32 is fixed to the belt 48 by the fixing member 49.

The pulling conveyor 34 with the above configuration can drive the belt 48 by rotating the motor 44. As the belt 48 moves, the suction part 33 is moved along the longitudinal direction of the guide 31 together with the slide base 32.

As shown in FIG. 3, a first position sensor 57 is arranged at an end of the travel range of the slide base 32 further from the mounting base 30 and a second position sensor 58 is arranged at the other end closer to the mounting base 30. The first position sensor 57 and the second position sensor 58 can detect that the slide base 32 (in other words, the suction part 33) is at the limit of its travel range. The configurations of the first position sensor 57 and the second position sensor 58 may be determined as desired. For example, they may be reflective photosensors that detect the slide base 32.

The surface of the belt 48 functions as a conveying surface for conveying the article 5. When the article 5 is on the belt 48 at the upper side of the guide 31, the belt 48 can convey the article 5 along the longitudinal direction of the guide 31 by driving the motor 44.

The cylinder 35 is configured as a pneumatic cylinder. As shown in FIG. 3, the cylinder 35 is attached to the back plate 42 of the suction part 33 with its axis vertical. The cylindrical portion of the cylinder 35 is fixed to the back plate 42, and an end of the rod of the cylinder 35 is fixed to the slide base 32. The cylinder 35 is connected to a compressed-air source that is not shown in the drawings. With compressed air switching between states where it is supplied and not supplied to the cylinder 35, the suction part 33 can be raised and lowered.

A pair of slide guides 50 are arranged on the slide base 32. The slide guides 50 guide the travel direction in which the suction part 33 is raised and lowered.

The camera 36 is arranged at the top of the mounting base 30. The camera 36 is configured, for example, as a stereo camera. The direction in which the camera 36 faces is approximately the same as the direction in which the guide 31 protrudes from the mounting base 30.

The camera 36 can capture an image of the front face of the article 5 through the opening of the container 6. By performing image analysis by a computer (e.g., the controller 60) on the obtained image, the width W and the height H of the article 5 to be taken out can be obtained.

The faces of the article 5 other than the front face are covered by the other articles 5 or the container 6. Therefore, it is extremely difficult to obtain the depth D of the article 5 from the image captured by the camera 36.

Then, the configuration for detecting that the distal end of the guide 31 supports the article 5 will be described below with reference to FIG. 2.

The shaft 55 of the driven roller 47, which is included in the pulling conveyor 34, is supported by the guide 31 in such a way that it can move with a small stroke in the vertical direction. A spring (an elastic member), which is not shown in the drawings, biases this shaft upward. A limit switch (sensor) 56 is arranged below one end of the shaft 55.

With this configuration, when the article 5 is loaded on the belt 48 near the distal end of the guide 31, the driven roller 47 is pushed downward by the article 5. As a result, the shaft 55 of the driven roller 47 moves downward and presses the limit switch 56. Thus, it can be detected that the article 5 is received by the guide 31.

Instead of the limit switch 56, a sensor with any configuration may be used. For example, an optical sensor may detect the displacement of the shaft 55.

Figure 4:
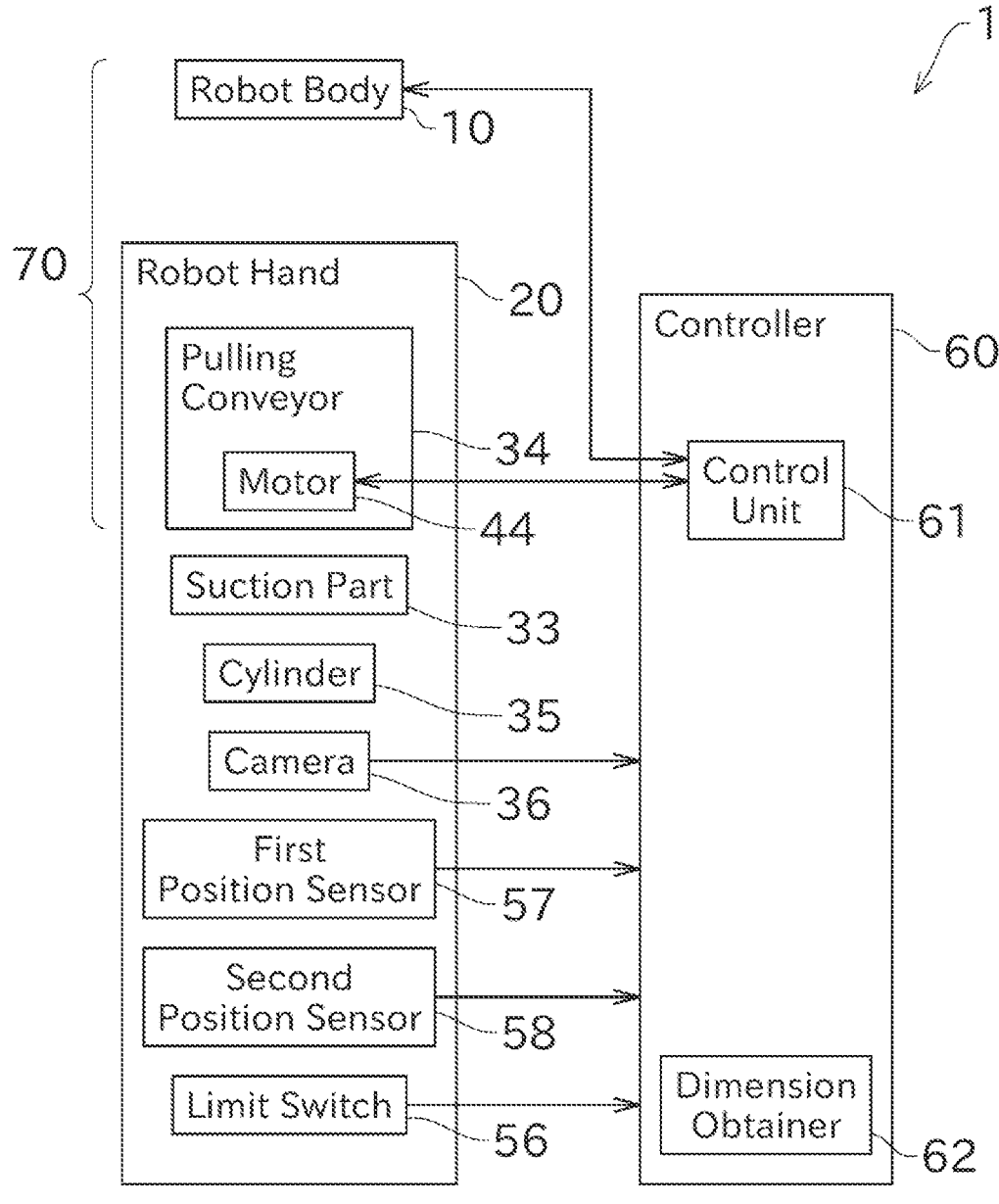
FIG. 4 is a functional block diagram showing an electrical configuration of a robot.

Then, the configuration for automatically obtaining the depth D of the article 5 will be described below with reference to FIG. 4. FIG. 4 is a functional block diagram showing the electrical configuration in the robot 1.

The robot body 10 and the robot hand 20 are electrically connected to the controller 60. The controller 60 can operate the robot body 10 and the robot hand 20 to perform predetermined actions.

The motor 44 of the pulling conveyor 34, which is included in the robot hand 20, is electrically connected to the controller 60. The camera 36, the first position sensor 57, the second position sensor 58, and the limit switch 56, that are included in the robot hand 20, are electrically connected to the controller 60.

A solenoid valve, which is not shown in the drawings, is arranged in the middle of the path connecting the suction part 33 and the negative pressure source. Another solenoid valve, which is not shown in the drawings, is also arranged in the middle of the path connecting the cylinder 35 and the compressed-air source. These solenoid valves are electrically connected to the controller 60.

The controller 60 includes a control unit 61 and a dimension obtainer 62.

Specifically, a program for realizing an article dimension obtainment method disclosed in the present disclosure is stored in the memory unit of the controller 60. This program allows the controller 60 to function as the control unit 61 and the dimension obtainer 62.

The control unit 61 outputs control signals to the robot body 10 and the robot hand 20. The pulling conveyor 34 of the robot hand 20 and the robot body 10 can pull out the article 5 to the front as described below. Accordingly, the pulling conveyor 34 and the robot body 10 are comprised in a pullout mechanism (puller) 70.

The dimension obtainer 62 obtains the depth D of the article 5 based on when the limit switch 56 is pressed.

The operation of the robot 1 for the obtainment of the depth D dimension of the article 5 will be described in details below.

Figure 5:
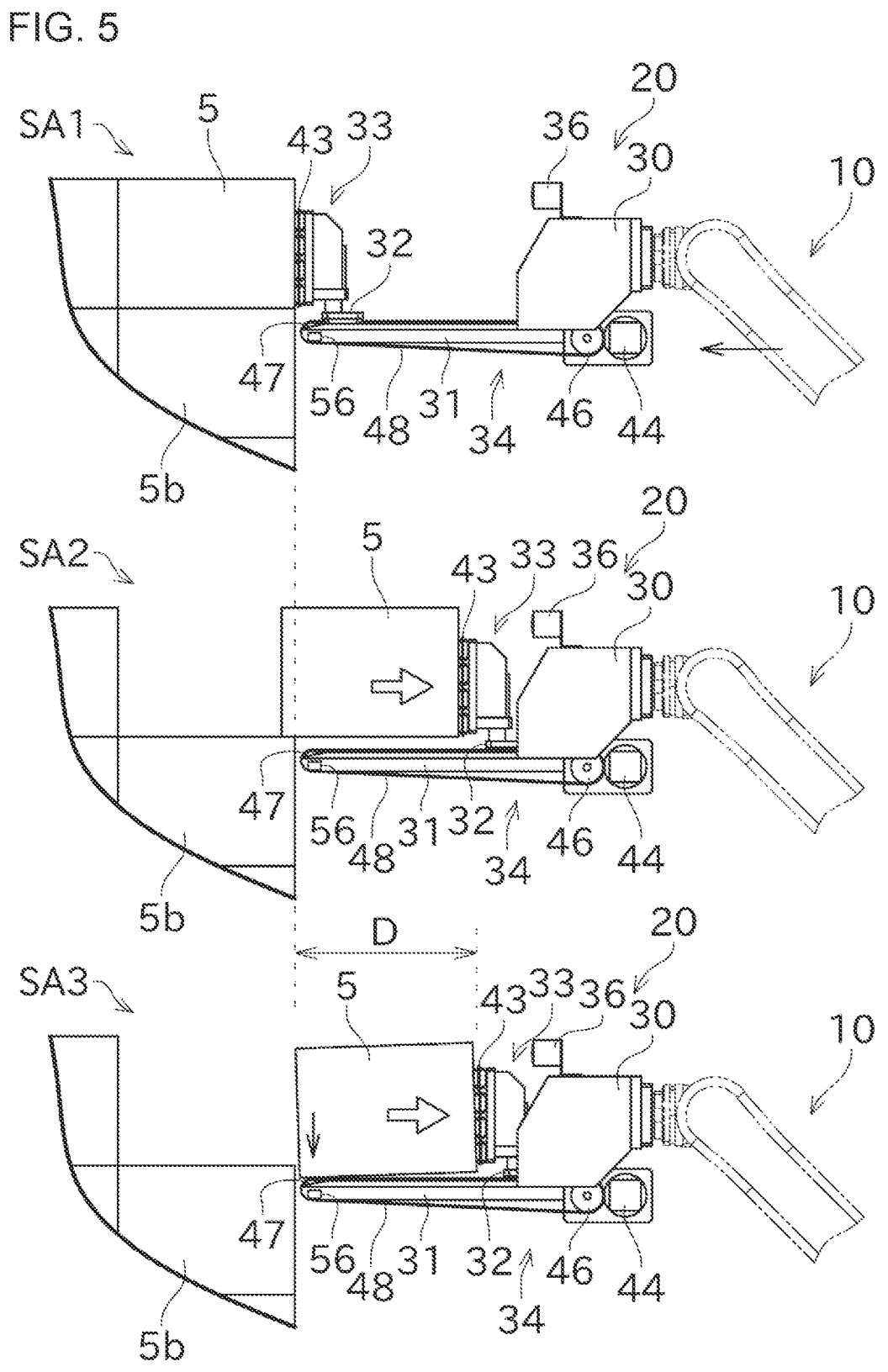

In FIG. 5, an article placed under the article 5 to be pulled out is marked with a reference 5b. The lower article (supporter) 5b supports the article 5 to be pulled out from below. Since the articles 5 are neatly stacked, the front face of the article 5 and the front face of the lower article 5b belong to the same plane.

First, as shown in FIG. 2 and the other drawings, in the robot hand 20, the suction part 33 is moved to the distal end of the guide 31. As a result, the suction pads 43 are positioned deeper than the distal end of the guide 31. The orientation of the robot hand 20 is adjusted to the basic orientation described above. The orientation of the robot hand 20 is also adjusted to align the longitudinal direction of the guide 31 parallel to the direction of the depth D of the article 5.

Next, the supply of negative pressure to the suction pads 43 is started. With this state, the robot body 10 is operated to move the suction part 33 closer to the front face of the article 5 whose depth D is to be obtained, while maintaining the orientation of the robot hand 20.

The position of the robot hand 20 when the suction part 33 sticks the article 5 is controlled so that it has a suitable height. As a result, the top surface of the guide 31 (in other words, the top surface of the belt 48) becomes lower than the bottom edge of the front face of the article 5 whose depth 1) is to be obtained.

Then, as shown by state SA1 in FIG. 5, the suction pads 43 come into contact with the front face of the article 5 and sucks and sticks to this face. The controller 60 determines the completion of suction based on output from a suitable sensor, which is not shown in the drawings. As this sensor, for example, a pressure sensor that measures negative pressure may be used.

On detecting the completion of the suction, the controller 60 immediately stops the operation of the robot body 10. Then, the controller 60 drives the pulling conveyor 34 to move the suction part 33 closer to the mounting base 30, without changing the position and the orientation of the robot hand 20. As a result, the article 5 is pulled out remaining on the lower article 5b, as shown by state SA2 in FIG. 5. The top surface of the guide 31 of the robot hand 20 is adjusted to be lower than the bottom face of the article 5. Therefore, when the article 5 is only partially pulled out, the bottom surface of the article 5 does not contact the guide 31.

When the article 5 is fully pulled out, the article 5 is took off from the lower article 5b, as shown by state SA3 in FIG. 5. In other words, the article 5 separates from the top face of the lower article 5b. At the moment when the article 5 is fully pulled out, the article 5 changes its state from being supported at two end to being supported at only one end.

Since the support of the article 5 by the lower article 5b is lost, all of the weight of the article 5 acts on the suction part 33. Since the suction pad 43 is capable of changing its shape, gravity causes the article 5 to slightly descend and the orientation of the article 5 tilts so that the deeper side of the article 5 becomes lower. As a result, the bottom face of the article 5 contacts the guide 31 (specifically, a portion of the belt 48 that includes the driven roller 47) and pushes it downward, thus the limit switch 56 is pushed. In this manner, the limit switch 56 detects that the article 5 ceased being on the lower article 5b.

The control unit 61 of the controller 60 pulls out the article 5 by the pulling conveyor 34 while monitoring the state of the limit switch 56. When the limit switch 56 detects the article 5, the dimension obtainer 62 of the controller 60 calculates the distance for which the suction part 33 is slid by the pulling conveyor 34 between the times when pulling out of the article 5 starts with state SA1 in FIG. 5 and when the limit switch 56 detects that the article 5 separated from the top face of the lower article 5b with state SA3 as the depth D of the article 5.

Figure 6:
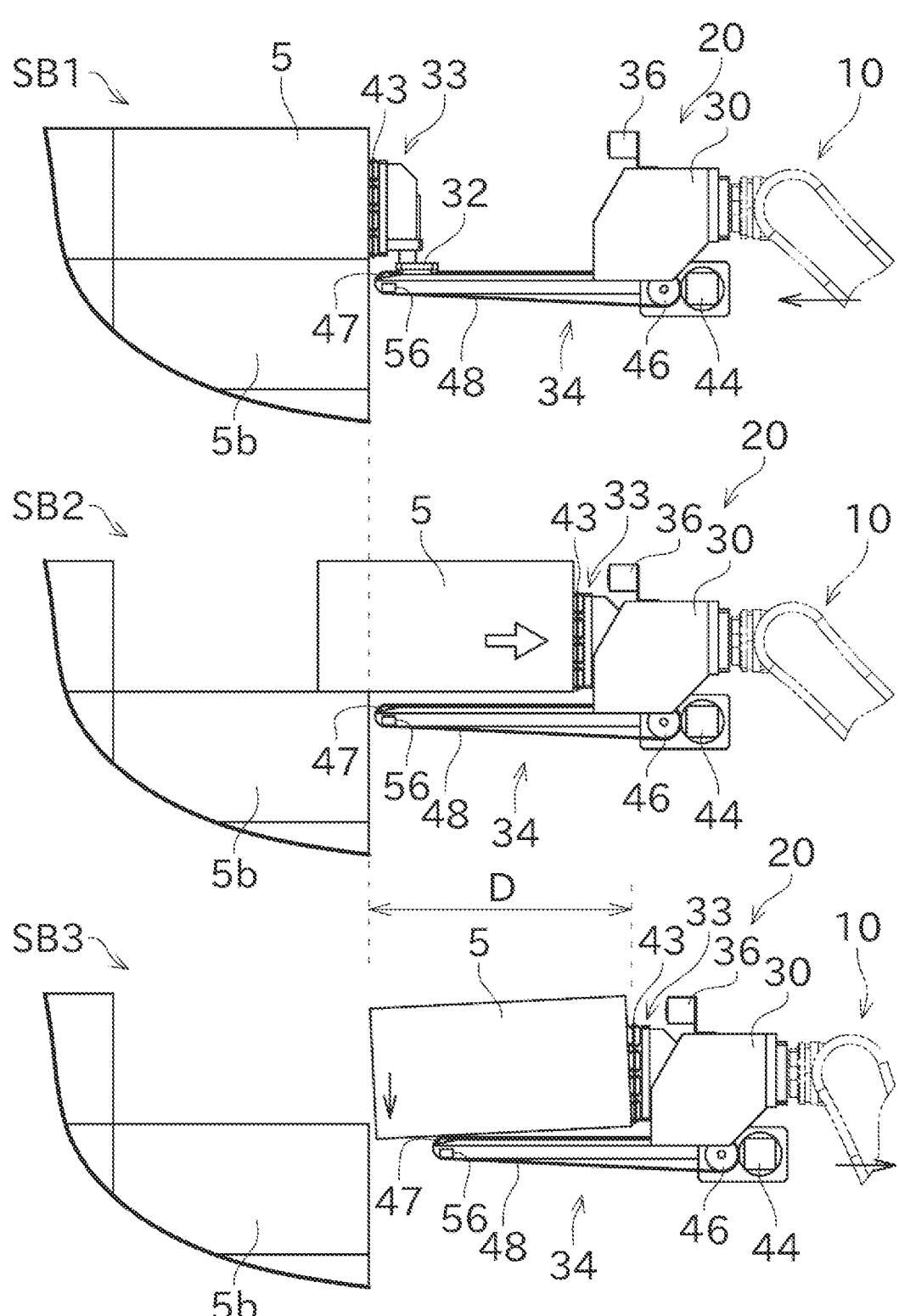
FIG. 6 is a side view illustrating another operation of a robot obtaining a depth dimension of an article.

FIG. 6 shows an example where the depth D of the article 5 is large. In this example, even when the article 5 is pulled out by the pulling conveyor 34 from state SB1 in FIG. 6 to the limit of the slide movement of the suction part 33, the article 5 remains supported by the lower article 5b, as shown by state SB2 in FIG. 6. In this case, the controller 60 pulls out the article 5 along with the robot hand 20 by moving the robot body 10. Eventually, the limit switch 56 detects the article 5 as shown by state SB3 in FIG. 6. In this case, the depth D of the article 5 is the sum of the pullout distance of the article 5 by the pulling conveyor 34 and the pullout distance of the article 5 by the robot body 10.

With the above configuration, the depth D, which is difficult to obtain with the camera 36, can be properly obtained. Thus, further automation of the devanning operation can be achieved. Since the depth D is obtained during the process of pulling out the article 5, the obtainment can be achieved restraining decrease in the efficiency of the work of taking out the article 5.

This method of obtaining the depth D is only applicable to the article 5 stacked on the floor of the container 6 which is second to or higher than the lowest article 5 and the depth D of the lowest article 5 cannot be obtained. Note, however, when the depth D of all articles 5 vertically stacked is equal and when that is known in advance, obtaining the depth D of the topmost article 5 is adequate. When information about the depth D is obtained in advance, the takt time of the devanning operation can be reduced by minimizing the distance for which the article 5 is pulled out.

The controller 60 controls the speed at which the article 5 is pulled out so that the speed becomes lower when the depth D is obtained during the pullout operation of the article 5 than when only the pullout operation is performed. This allows the depth D to be obtained with high accuracy. Although the takt time for taking out the article 5 increases when the depth D is obtained, the overall work time can be reduced by obtaining the depth D only of a part of the articles 5 to be devanned.

Figure 7:
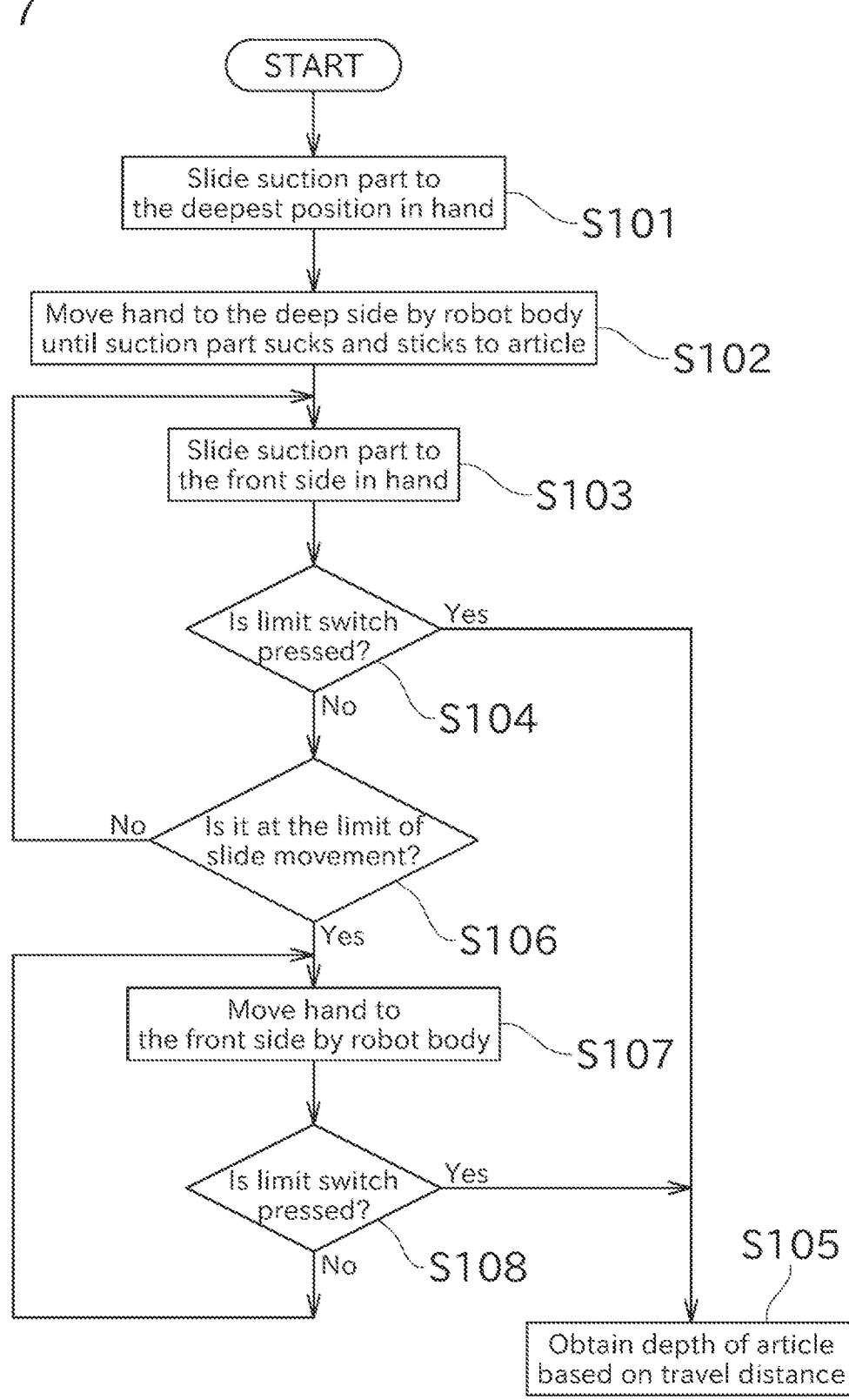
FIG. 7 is a flowchart illustrating a process performed by a robot.

The process performed by the controller 60 with respect to the obtainment of the depth D will be described below with reference to the flowchart in FIG. 7.

First, the control unit 61 of the controller 60 drives the pulling conveyor 34 of the robot hand 20 to slide the suction part 33 to the deepest position (step S101). Whether or not the suction part 33 is at the deepest position can be determined by using the first position sensor 57.

Next, the control unit 61 moves the robot hand 20 to the deep side by the robot body 10 and let the suction part 33 suck and stick to the front face of the article 5 (step S102).

When the article 5 is sucked and stuck to the suction part 33, the control unit 61 slides the suction part 33 by the pulling conveyor 34 to the front side by a small distance (step S103). With the suction part 33, the article 5 also moves to the front side.

Then, the control unit 61 examines the state of the limit switch 56 (step S104). If the limit switch 56 is pressed, the dimension obtainer 62 of the controller 60 calculates the cumulative total of the distance that the article 5 moved through steps S103 as the depth D of the article 5 (step S105).

If the limit switch 56 is not pressed, the control unit 61 determines whether the suction part 33 is at the front end of its travel range of the slide movement (step S106). This determination can be made using the second position sensor 58. If the suction part 33 has not reached the limit of its slide movement, the process returns to step S103. By repeating the process through steps S103, S104, and S106, the article 5 can be pulled out with the state of the limit switch 56 monitored.

If the suction part 33 is at the limit of its range of the slide movement, the control unit 61 slides the robot hand 20 by the robot body 10 to the front side by a small distance (step S107). With this movement, the article 5 also moves to the front side.

Then, the control unit 61 examines the state of the limit switch 56 (step S108). If the limit switch 56 is pressed, the dimension obtainer 62 of the controller 60 calculates the cumulative total of the distance that the article 5 moved through steps S103 and S107 as the depth D of the article 5 (step S105). If the limit switch 56 is not pressed, the process returns to step S107. By repeating the process through steps S107 and S108, the article 5 can be pulled out with the state of the limit switch 56 monitored.

As described above, the robot 1 of the present embodiment includes the suction part 33, the pullout mechanism 70, the limit switch 56, and the dimension obtainer 62. The suction part 33 holds the article 5 placed on the article 5b. The pullout mechanism 70 pulls the suction part 33 to the front side. The limit switch 56 detects that the article 5 being pulled out ceased being on the lower article 5b. The dimension obtainer 62 obtains the depth D, which is the dimension of the article 5 along the pullout direction, based on the distance that the article 5 is pulled for from when the pullout mechanism 70 starts to pull out the article 5 until when the limit switch 56 detects that the article 5 ceased being on the lower article 5b.

This allows the depth D of the article 5 to be obtained based on when the lower article 5b ceases supporting the article 5 in the process of pulling out the article 5.

The robot 1 of the present embodiment starts to pull out the article 5 with the front face of the article 5 and the front face of the lower article 5b belonging to the same plane.

This allows the dimension obtainer 62 to obtain the depth 1) of the article 5 by a simple calculation.

The robot of the present embodiment also includes the robot body 10 and the robot hand 20. The robot hand 20 is attached to the distal end of the robot body 10. The limit switch 56 is arranged at the robot hand 20.

This allows the robot hand 20 to realize the function of obtaining the depth D of the article 5.

The robot 1 of the present embodiment also includes the controller 60 that controls the robot body 10 and the robot hand 20. The robot hand 20 includes the guide 31 that carries the article 5 that ceased being on the lower article 5b. The controller 60 controls the pullout mechanism 70 so that the article 5 is pulled out while the top surface of the guide 31 being lower than the bottom edge of the front face of the article 5.

This ensures that the article 5 does not contact the guide 31 when the article 5 is on the lower article 5b.

In the robot 1 of the present embodiment, the limit switch 56 is arranged at the guide 31.

This allows the limit switch 56 to detect that the article 5 ceased being on the lower article 5b and is loaded on the guide 31.

In the robot 1 of the present embodiment, the limit switch 56 detects that the article 5 ceased being on the lower article 5*b*.

This allows a simple configuration for the obtainment of the depth D.

In the robot of the present embodiment, the suction part 33 is arranged at the robot hand 20, which is attached to the distal end of the robot body 10. The pullout mechanism 70 includes the pulling conveyor 34 that is arranged at the robot hand 20 and slides the suction part 33.

This allows the depth D to be obtained while the article 5 is being pulled out by the robot hand 20.

In the robot 1 of the present embodiment, if the limit switch 56 does not detect that the article 5 ceased being on the lower article 5*b* even after the pulling conveyor 34 moved the suction part 33 to the limit of the slide movement, the robot body 10 pulls out the article 5 further together with the robot hand 20 until the limit switch detects it.

This allows the depth D of the article 5 to be properly measured even when the depth D is large.

In the present embodiment, the dimension of the article 5 is obtained with a method as follows. That is, an article dimension obtainment method includes a pulling out process, a detecting process, and an obtaining process. In the pulling out process, the article 5, which is on the lower article 5*b* and whose front face belongs to the same plane as the front face of the article 5*b*, is pulled out to the front by at least one of the robot body 10 or the robot hand 20. In the detecting process, the limit switch 56 detects that the article 5 being pulled out ceased being on the lower article 5*b*. In the obtaining process, the depth D, which is the dimension of the article 5 along the pullout direction, is obtained based on a distance that the article 5 is pulled for from when the pulling out process starts until when that the article 5 ceased being on the lower article 5*b* is detected.

This allows the depth D of the article 5 to be obtained based on when the lower article 5*b* ceases supporting the article 5 in the process of pulling out the article 5.

While the preferred embodiment of the present disclosure has been described above, the configurations explained above may be modified, for example, as follows.

In the above-described embodiment, as shown by state SA1 in FIG. 5 and state SB1 in FIG. 6, the front face of the article 5 and the front face of the lower article 5*b* belong to the same plane when the article 5 starts to be pulled out. Note, however, even if the front faces do not belong to the same plane and an offset is made in the pullout direction, the dimension obtainer 62 still can obtain the depth D of the article 5 if the amount of the offset is known in advance. There may be a case where some margin of error in the depth D of the article 5 is allowed. When this is the case, the front face of the article 5 does not have to belong to exactly the same plane as the front face of the lower article 5*b*.

Instead of the limit switch 56, for example, a strain gauge (a strain sensor) may be arranged at the guide 31 or the like. The strain gauge detects the strain produced in the guide 31 due to the weight of the article 5 acting on the guide 31. This strain gauge can also detect that the article 5 ceased being on the lower article 5*b*.

Instead of the limit switch 56, a force sensor may be arranged at the distal portion of the robot body 10. The force sensor detects a change in the force acts on the distal portion of the robot body 10 that occurs as the weight of the article 5 becomes cantilevered by the suction part 33. This force sensor can also detect that the article 5 ceased being on the lower article 5*b*. In this configuration, the guide 31 in the robot hand 20 can be omitted.

The robot hand 20 may hold the article 5 by a method other than the suction by negative pressure. For example, the robot hand 20 may be equipped with a clamping part that clamps the article 5.

In the robot hand 20, the pulling conveyor 34 may slide the suction part 33 by a method other than driving the belt 48. For example, the slide base 32 may be moved by a screw feed mechanism.

The pullout mechanism 70 may be comprised only of the pulling conveyor 34 of the robot hand 20 or only of the robot body 10.

The obtainment of the depth D may be achieved by the controller 60 or by another computer.

The robot hand 20 may be controlled by the controller 60 of the robot body 10 or by another computer.

The supporter that supports the article 5 whose depth D is to be obtained from below is not limited to the article 5*b*, but it may be, for example, a support stand or the like. The shapes of the article 5 and the lower article 5*b* may be different from each other.

The depth D of an object other than a box may also be measured. The shape of the article 5 is not limited to rectangular. For example, the depth D of an L-shaped article in side view may be measured.

The functionality of the elements disclosed herein including the controller 60 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot, comprising:
a holder that holds an article placed on a supporter;
a puller that pulls the holder to a front side;
a limit switch that detects that the article being pulled out ceased being on the supporter;
a dimension obtainer that obtains a dimension of the article along a pullout direction based on a distance that the article is pulled for from when the puller starts to pull out the article until when the limit switch detects that the article ceased being on the supporter,
a robot body; and
an end effector that is attached to a distal end of the robot body, wherein the limit switch is arranged at the end effector.

2. The robot according to claim 1, wherein a pullout of the article starts with a face of the article on the front side and a face of the supporter on the front side belonging to a same plane.

3. The robot according to claim 1, comprising a controller that controls the robot body and the end effector,
wherein the end effector includes a receiver that carries the article that ceased being on the supporter, and wherein the controller controls the puller so that the article is pulled out while a top surface of the receiver being lower than a bottom edge of a face of the article on the front side.

4. The robot according to claim 3, wherein the limit switch is arranged at the receiver.

5. The robot according to claim 1, wherein the holder is arranged at the end effector that is attached to a distal end of the robot body, and wherein the puller includes a pulling conveyor that is arranged at the end effector and slides the holder.

6. The robot according to claim 5, wherein, if the limit switch does not detect that the article ceased being on the supporter even after the pulling conveyor moved the holder to a limit of slide movement, the robot body pulls out the article further together with the end effector until the limit switch detects it.

7. A robot, comprising:
a holder that holds an article placed on a supporter;
a puller that pulls the holder to a front side;
a strain sensor that detects that the article being pulled out ceased being on the supporter;
a dimension obtainer that obtains a dimension of the article along a pullout direction based on a distance that the article is pulled for from when the puller starts to pull out the article until when the strain sensor detects that the article ceased being on the supporter;
a robot body; and
an end effector that is attached to a distal end of the robot body, wherein the strain sensor is arranged at the end effector.

8. A robot, comprising:
a holder that holds an article placed on a supporter;
a puller that pulls the holder to a front side;
a sensor that detects that the article being pulled out ceased being on the supporter;
a dimension obtainer that obtains a dimension of the article along a pullout direction based on a distance that the article is pulled for from when the puller starts to pull out the article until when the sensor detects that the article ceased being on the supporter;
a robot body; and
an end effector that is attached to a distal end of the robot body, wherein
the sensor is a force sensor that is arranged at a distal end of the robot body.

9. A robot, comprising:
a holder that holds an article placed on a supporter;
a puller that pulls the holder to a front side;
a sensor that detects that the article being pulled out ceased being on the supporter; and
a dimension obtainer that obtains a dimension of the article along a pullout direction based on a distance that the article is pulled for from when the puller starts to pull out the article until when the sensor detects that the article ceased being on the supporter, wherein the holder is arranged at an end effector that is attached to a distal end of a robot body, and wherein the puller includes a pulling conveyor that is arranged at the end effector and slides the holder.

* * * * *